US00H002073H

(19) United States

(12) Statutory Invention Registration (10) Reg. No.: US H2073 H

Culotta (43) Published: Jul. 1, 2003

(54) DEFECT PROPAGATION RESISTANT STRETCH FILMS

(75) Inventor: Anne M. Culotta, Houston, TX (US)

(73) Assignee: Exxon Chemical Patents Inc., Houston, TX (US)

(21) Appl. No.: 09/516,963

(22) Filed: Jun. 19, 2000

(51) Int. Cl.[7] ..... C08L 23/00

(52) U.S. Cl. ..... 525/240; 525/191

(58) Field of Search ..... 525/191, 240

(56) References Cited

U.S. PATENT DOCUMENTS 5,709,932 A * 1/1998 Glez et al. ..... 428/220
5,904,964 A * 5/1999 Snyder ..... 428/35.1
5,942,579 A * 8/1999 Falla et al. ..... 525/240

* cited by examiner

*Primary Examiner*—Michael J. Carone
*Assistant Examiner*—M Thomson
(74) *Attorney, Agent, or Firm*—Gerald L. Harris

(57) ABSTRACT

A defect propagation resistant stretch film comprising a polymer of linear low density polyethylene and one or more copolymers selected from the group consisting of low density polyethylene, very low density polyethylene, and ultra low density polyethylene.

2 Claims, 16 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELONGATION AT BREAK

DEFECT PROPAGATION RESISTANT STRETCH FILMS

BACKGROUND AND OVERVIEW

The use of thermoplastic stretch wrap films for the overwrap packaging of goods, and in particular, the unitizing of palleted loads is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Historically, higher performance stretch films have been prepared with m-LLDPE, most often with the m-LLDPE located in an interior layer. Such films have shown markedly improved puncture and impact resistance as well as improved film clarity relative to counterparts made with more traditional Ziegler-Natta LLDPE's. Stretch films employing higher amounts (up to 100 wt %) of m-LLDPE either as a discrete layer or layers, or as a blend component in a discrete layer or layers of a multilayer stretch film, propagate defects more easily leading to web breakage. This defect propagation has precluded the development of film structures containing higher concentrations of m-LLDPE to maximize toughness. The results of this work show that stretch films with significantly improved defect propagation resistance relative to the following film types can be made: 1) A five-layer (A/B/C/B/A) stretch film formulation common in the stretch film industry where A=C=Ziegler-Natta ethylene-hexene LLDPE and B=m-LLDPE; 2) A stretch film comprised of 100 wt % ethylene-hexene or 100 wt % ethylene-octene Ziegler-Natta copolymer.

TEST METHODS EMPLOYED

Film Testing Methods: MD and TD refer to the machine direction and transverse direction, respectively, as they relate to cast film production. Film Gauge (Exxon PLFL-238.001), Laboratory Puncture Force (Exxon PLFL-201.01), Elmendorf Tear (ASTM D1922-94); Cling (Exxon PLFL-201.02 based on ASTM D5458-95), Melt Index (ASTM D1238-94), Density (ASTM D1505-96, compression molding of samples by ASTM D1928-96), FDA Hexane Extractables (21 CFR 177.1520(d)(3)(ii)). The Highlight Ultimate Stretch Test and the Highlight Puncture Test were each conducted in accord with Highlight Industries, Inc. Film Development Test System Operations Manual (Copyright, 1996).

SUMMARY

In this work, a defect was introduced by way of a Highlight Stretch Tester Puncture Test (at progressively higher levels of stretch). Destruction of the web was designated by us as Failure Mode (FM) 3, the type of film failure deemed most undesirable because web failure requires more operator attention and effort in stretch wrap applications as those skilled in the art of stretch film know. FM2 referred to a film puncture, but no defect propagation. While still undesirable, the web was not destroyed, merely damaged by a hole in this mode of failure. In FM1 the probe did not puncture the film and would be the most desirable.

This research disclosure shows how 5-layer film structures can be prepared with higher levels of m-LLDPE, particularly in the skin and core film layers, that do not propagate a defect (FM3) as discussed above, thereby maintaining the integrity of the web during use. Other performance benefits were noted from certain film structures prepared in this work such as an optimal balance of stiffness and extensibility, a minimization in cling force reduction upon stretching, and a minimization in unwind force. Some film samples (such as samples 004 and 007) were highly extensible, and required higher levels of force to stretch the film in the Highlight Ultimate Stretch Test. In some applications, this combination of stiffness and extensibility is preferred. Also noted in this work was that the reduction in cling force with film stretching generally experienced by those skilled in stretch film was minimized for some film samples. By way of example, cling force at 200% stretch was higher for samples 004–005 than for samples 014–015. Most noteworthy was the higher cling force at 200% stretch of samples 001–011 relative to sample 013, prepared from ethylene-octene LLDPE. Finally, while the relationship between unwanted increases in unwind force and higher extractables concentrations are well known to those skilled in the art of stretch film, some of the film samples prepared herein exhibited dramatic increases in unwind force and unwind noise unrelated to extractables. The root cause of the unwind force increase was strain-induced crystallization. Steps to mitigate strain-induced crystallization and thus avoid unwanted increases in unwind force will be addressed.

POLYMER PROPERTIES AND FILM COMPOSITION

Figure 1:
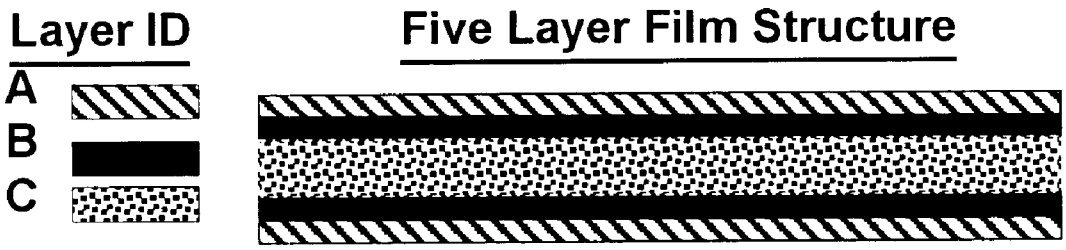
FIG. 1 is the general film structure.

A summary of the polymer properties used in making the film samples described herein can be found in Table 1. The composition of each film prepared in this work is given in Table 2.

TABLE 1

Properties of polyethylene polymers used and key to polymer ID in graphs

| Name in Graphs | Grade Name | Melt Index (MI, dg/min) | Density (g/cc) | Comonomer | Catalyst Type | Process Type |
|---|---|---|---|---|---|---|
| m-LLDPE1 | Exceed™ 357C32 | 3.4 | 0.917 | 1-n-Hexene | Metallocene (Exxpol™) | Gas phase |
| LLDPE1 | Escorene™ LL-3003.32 | 3.0 | 0.917 | 1-n-Hexene | Ziegler-Natta | Gas phase |
| LLDPE2 | Escorene™ LL-1002.32 | 2.0 | 0.917 | 1-n-Butene | Ziegler-Natta | Gas phase |
| m-plastomer | Exact™ 4049 | 4.5 | 0.873 | 1-n-Butene | Metallocene (Exxpol™) | Gas phase |
| LLDPE3 | Dowlek™ 3347A | 2.3 | 0.917 | 1-n-Octene | Ziegler-Natta | Solution phase |
| LLDPE4 | Escorene™ LL-3023.32 | 2.35 | 0.917 | 1-n-Hexene | Ziegler-Natta | Gas phase |
| HDPE | Escorene™ HD-7845.30 | 0.45 | 0.9580 | — | Mitsui Slurry | Slurry |
| LDPE | Eswrene™ LD-135.09 | 3.0 | 0.921 | LD-homopolymer | Free radical | High pressure |

TABLE 2

Film Composition

| Film Sample ID → | 003,006,009[1] (A/B/C/B/A) | 001 (A/B/C/B/A) | 002 (A/B/C/B/A) | 004 (A/B/C/B/A) | 005 (A/B/C/B/A) | 007 (A/B/C/B/A) |
|---|---|---|---|---|---|---|
| (A/B/C/B/A) Layer Ratios (wt %) | 10/20/40/20/10 | 10/15/50/15/10 | 10/25/30/25/10 | 10/15/50/15/10 | 10/25/30/25/10 | 10/15/50/15/10 |
| | Layer A 80 wt % m-LLDPE1 Layer A 20 wt % m-plastomer Layer B 2.5 wt % HDPE Layer B 97.5 wt% LLDPE2 Layer C 90 wt % m-LLDPE1 Layer C 10 wt % LDPE | Layer A 80 wt % m-LLDPE1 Layer A 20 wt % m-plastomer Layer B 100 wt % LLDPE1 Layer C 100 wt % m-LLDPE1 | Layer A 80 wt % m-LLDPE1 LayerA 20 wt % m-plastomer Layer B 100 wt % LLDPE1 Layer C 80 wt % m-LLDPE1 Layer C 20 wt % LDPE | Layer A 80 wt % m-LLDPE1 Layer A 20 wt % m-plastomer Layer B 5 wt % HDPE Layer B 95 wt % LLDPE1 Layer C 80 wt % m-LLDPE1 Layer C 20 wt % LDPE | Layer A 80 wt % m-LLDPE1 Layer A 20 wt % m-plastomer Layer B 5 wt % HDPE Layer B 95 wt % LLDPE1 Layer C 100 wt % m-LLDPE1 | Layer A 80 wt % m-LLDPE1 Layer A 20 wt % m-plastomer Layer B 100 wt % m-LLDPE1 Layer C 80 wt % m-LLDPE1 Layer C 20 wt % LDPE |
| Film Sample ID → | 008 (A/B/C/B/A) | 010 (A/B/C/B/A) | 011 (A/B/C/B/A) | 013 (A/B/C/B/A) | 014 (A/B/C/B/A) | 015 (A/B/C/B/A) |
| Layer Ratios (wt %) | 10/25/30/25/10 | 10/15/50/15/10 | 10/25/30/25/10 | 10/20/40/20/10 | 10/20/40/20/10 | 10/20/40/20/10 |
| | Layer A 80 wt % m-LLDPE1 Layer A 20 wt % m-plastomer Layer B 100 wt % m-LLDPE1 Layer C 100 wt % HDPE | Layer A 80 wt % m-LLDPE1 Layer A 20 wt % m-plastomer Layer B 95 wt % m-LLDPE1 Layer B 5 wt % HDPE Layer C 100 wt % m-LLDPE1 | Layer A 80 wt % m-LLDPE1 Layer A 20 wt % m-plastomer Layer B 95 wt % m-LLDPE1 Layer B 5 Layer C 80 wt % m-LLDPE1 Layer C 20 wt % LDPE | Layer A 100 wt % LLDPE3 Layer B 100 wt % LLDPE3 Layer C 100 wt % LLDPE3 | Layer A 100 wt % LLDPE4 Layer B 100 wt % LLDPE4 Layer B 100 wt % LLDPE4 | Layer A 100 wt % LLDPE4 Layer B 100 wt % m-LLDPE1 Layer C 100 wt % LLDPE4 |
| wt % m-LLDPE1 | | | | | | |

[1]Film Samples 003, 006 and 009 were replicate centerpoints. In Figs. That follow, these points are collectively referred to as Film Sample ID "0".

Film Extrusion Conditions

All films were prepared on a Black Clawson cast film extrusion line equipped with a 42" wide Cloeren die and five-layer A/B/C/B/A feed block. Typical LLDPE barrier screws were employed. The B/C layer ratio was varied by changing relative extruder output while holding the total throughput constant at 550 lb/hr. The die gap was set to 20 mil. Die temperatures were set to 550–555° F. The melt curtain length was 3.75 inches long. The primary and secondary chill roll temperature inlet water temperatures were 70° F. and 72° F., respectively. The target gauge of 0.80 mil was achieved with the range of film gauges detected between 0.79–0.91 mil. Line speed was held constant at 699–701 ft/min. The film rolls were trimmed to 20" in width prior to winding. No trim was recycled. Melt temperatures: Layer A (544–547° F.), Layer B (551–562° F.), Layer C (556–575° F.). A winder tension of 8 lb. for the trimmed 20-inch rolls was employed.

The films made in this work were cast, 0.8 mil thick, although gauges of 0.5–1.5 mil could be employed without departing from the spirit of this work. The films were comprised of five layers of the structure type A/B/C/B/A as shown in FIG. 1, a general film structure, where Layer A=20 wt % (10 wt % per layer), but Layer A could vary 3–5 wt % to 30–40 wt % of the total film structure without departing from the spirit of this work. Layer A was comprised of 80 wt % m-LLDPE1 blended with 20 wt % m-plastomer, however, the concentration of m-plastomer could vary 3 wt %–40 wt % without departing from the spirit of this work. Layer B and Layer C were each blends of a major component and a minor component. In Layer B, the identity of the major was either LLDPE1, LLDPE2, or m-LLDPE1. The minor component in Layer B was always HDPE and varied in concentration 0–5 wt %, however, concentrations of 0–30 wt % would also be acceptable. The major component of Layer C was always m-LLDPE1. The minor component of Layer C was always LDPE and varied in concentration 0–20 wt %, although concentrations of 0–100 wt % would also be acceptable without departing from the spirit of this work.

M-LLDPE is often referred to as a low polydispersity polymer by virtue of the narrow molecular weight distribution imparted with single site catalysis during polymer production. While a particular m-LLDPE was employed in this work, other types of m-LLDPE ranging in MI from 0.5–15 dg/min, and density of 0.910–0.925 g/cc could be employed without materially changing the properties of the films. The low polydispersity m-LLDPE may be prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity m-LLDPE generally has the characteristics associated with an LLDPE material, however it has improved properties as explained more fully below. The low polydispersity m-LLDPE defined herein has a density of from about 0.88 to about 0.94 g/cc, preferably from about 0.88 to about 0.93 g/cc, and more preferably from about 0.88 to about 0.925 g/cc.

The average molecular weight of the low polydispersity m-LLDPE can generally range from about 20,000 to about 500,000, preferably from about 50,000 to about 200,000. The molecular weight is determined by commonly used techniques such as size exclusion chromatography or gel permeation chromatography. The low polydispersity m-LLDPE should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. The ratio of the third moment to the second moment, $M_z/M_w$, is generally below about 2.3, preferably below about 2.0, and more typically in the range of from about 1.6 to about 1.95. The melt flow ratio (MFR) of these polymers, defined as $I_{10}/I_2$ and as determined in accordance to ASTM D1238, is generally from about 12 to about 22, preferably from about 14 to about 20, and more preferably from about 16 to about 18. The melt index (MI), defined as the $I_2$value, should be in the range of from about 0.5 to about 10 g/10 min., preferably from about 1 to about 5 g/10 min. as determined by ASTM D1238. Useful low polydispersity m-LLDPEs are available from, among others, Dow Chemical Company and Exxon Chemical Company who are producers of single site or constrained geometry catalyzed polyethylenes. These polymers are commercially available as the AFFINITY and EXACT™ polyethylenes (see Plastics World, p.33–36, January 1995), and also as the ENHANCED POLYETHYLENE and EXCEED™ line of resins. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety. These catalyst systems and their use to prepare such copolymer materials are also set forth in EP 0 600 425 A1 and PCT applications WO 94/25271 and 94/26816. The low polydispersity polyethylene polymers thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in gas phase, high pressure, slurry, or solution polymerization schemes.

The low polydispersity m-LLDPE could be employed in any film layer or layers in film structures having as few as three layers or as many as nine layers. Several specific types of LLDPE were employed in this work, however, others could also be used without materially altering film properties.

In this work, at least one of the film layers comprises a low polydispersity m-LLDPE which is blended with an LDPE resin. The LDPE in Table 1 refers to an ethylene homopolymer prepared from high pressure (greater than 1000 psi) free radical processes. Comonomers could also be employed such as olefins in the $C_3$–$C_{20}$, vinyl esters in the $C_{3-C20}$ range, and/or acrylic acid derivatives in the $C_3$–$C_{20}$ range. The result of such polymerizations would be copolymers such as EVA, EMA, EEA, EnBA and so on. These LDPE copolymers would also be acceptable herein without materially changing the desired film properties. The LDPE resins have a density of from about 0.9 to about 0.935 g/cc and preferably a density of from about 0.915 to about 0.925 g/cc. The LDPE resins have a melt index ($I_2$) of from about 0.5 to about 10, preferably from about 1 to about 5, and most preferably from about 2 to about 4.0 g/10 min. The LDPE resins comprise from about 0 to about 30 wt. % of a polymeric layer or layers. It is preferred to maintain the level of the low polydispersity m-LLDPE to at least 70 weight percent of a polymeric layer or layers. Additional, material may be incorporated with the blend of the low polydispersity polymer and the LDPE resin.

While Layer B was chosen to carry the LLDPE in this study, any other film layer or layers in any film structure with as few as three or as many as nine film layers could have been employed without materially altering film properties as those skilled in stretch film know. As in other studies, the incorporation of LDPE into a film structure can lead to a desirable combination of film stiffness (high stretch force) and extensibility (elongation at break). Those persons skilled in stretch film know that there is an optimal concentration and type of LDPE that could be employed in stretch film. While a 3 MI, 0.921 g/cc density LDPE was used in this work, other LDPE's as described in the paragraphs above could be used without materially altering film properties. Those persons skilled in stretch film also know that the film structure, number of layers, thickness of the LDPE-containing layer, and choice of layers (A, B, C. . . etc.) to blend in LDPE are all important factors affecting the final properties of the stretch film.

Alternatively, the film layers could contain a blend of a low polydispersity m-LLDPE and a VLDPE resin such as the m-plastomer described in Table 1. The m-plastomers are resins with a density ranging from about 0.86 to about 0.912 g/cc, more commonly from about 0.87 to about 0.91 g/cc, and a melt index as $I_2$ of from about 0.5 to about 8 g/10 min., and preferably from about 1 to about 5 g/10 min. The m-plastomer comprises from about 2 to about 30 wt. % of a polymeric layer with the preferred range of from about 5 to about 25 wt. % of the outer polymeric layer or layers. Additional materials may be incorporated with the blend of the low polydispersity m-LLDPE and the m-plastomer resin.

While a specific type of m-plastomer was chosen for this study, other types of ultra low density polyethylene (ULDPE) or VLDPE (made from any number of different catalyst types) or polyisobutylene, or atactic polypropylene could also have been used without materially changing the desired film properties. These very low density materials could have been blended with any of the other components described herein, in any layer of a stretch film containing as few as three or as many as nine film layers in proportions from 2 wt %–40 wt % without materially changing the film properties. In this particular example, the outer layers of a five-layer film structure were chosen to contain the m-plastomer. Those skilled in stretch film will appreciate and understand the benefits that use of the m-plastomer will bring to stretch film performance such as cling enhancement, impact and puncture resistance. LLDPE refers to ethylene-butene, ethylene-hexene, or ethylene-octene copolymers prepared from Ziegler-Natta catalysts in gas phase, solution phase or slurry processes. LLDPE's with a MI ranging 0.5–20 dg/min, density ranging 0.910–0.935 g/cc, comonomer type $C_3$–$C_8$, made in either a solution or gas phase process would be acceptable without departing from the spirit of this work. Suitable LLDPEs include those having a density greater than about 0.900 g/cc, more preferably in the range of from about 0.900 to about 0.940g/cc. The LLDPEs may also have wide ranging MIs, generally up to about 30 g/10 min., preferably between about 0.5 to about 10 g/10 min. Such LLDPEs and methods for making the same are well known in the art and are readily available commercially under trade names such as Escorene™ LLDPE or Dowlex™ by way of example.

The HDPE in Table 1 refers an to ethylene homo- or copolymers of relatively high molecular weight and relatively low comonomer content prepared from, Ziegler-type catalysts or metallocene catalysts in gas phase, solution, or slurry processes. HDPE was employed as a blend component in Layer B, but could equally have been employed in any other layer of a stretch film having as few as three or as many as nine layers. The HDPE could be prepared from a variety of different process types. MI's 0.05–20 dg/min and densities 0.920–0.960 g/cc could be employed without materially changing the properties of the films. MI's in the range of 0.35–2 g/10 min. and densities of 0.94–0.96 g/cc are most preferred. Other highly crystalline polymers could have also been employed such as polypropylene or polystyrene.

Results

Stretch films such as samples 003, 006 or 009 by way of example in Table 3 proved both economically attractive and desirable in performance, particularly with respect to defect propagation resistance. Specifically, the structure of these A/B/C/B/A films was as follows: Layer A=80 wt % m-LLDPE1 blended on-line with 20 wt % m-plastomer; Layer B=97.5 wt % LLDPE2 blended on-line with 2.5 wt % HDPE; Layer C=80 wt % m-LLDPE1 blended on-line with 10 wt % LDPE. The layer ratios (wt %) of these A/B/C/B/A films were 10/20/40/20/10, respectively. Other ratios or different polymers such as described in the preceding paragraph could also be used without departing from the spirit of this work and would be known to those skilled in the art of stretch film. For even higher levels of performance, especially more extensibility without defect propagation, stretch films such as samples 001, 002, 004 or 005 proved attractive. In these formulations, LLDPE2 was employed as the major component of Layer B. The concentrations of minor components in Layers B and C and A/B/C/B/A layer ratios varied amongst the film samples.

Experimental Design

This study was conducted from a planned matrix of factors in a $2^{(4-1)}$ fractional pattern. The factors studied are given in Table 3 below.

TABLE 3

Experimental Factors

| Factor | Low Value | High Value | Center Point |
|---|---|---|---|
| ID of Layer B | LLDPE1 | m-LLDPE1 | LLDPE2 |
| Weight ratio of B/C Layers | 0.6 | 1.6 | 1 |
| wt % HDPE in Layer B | 0 | 5 | 2.5 |
| wt % LDPE in Layer C | 0 | 20 | 10 |

The films produced within this matrix (film samples 001–012) are referred to as "experimental films". For comparison, three additional films were produced. Film samples 013 and 014 were comprised of 100 wt % LLDPE3 and LLDPE4, respectively. These "monolayer" films were produced using the same A/B/C/B/A selector plug employed in the production of the experimental films; however, all extruders (A, B, and C) extruded an identical resin. Film sample 015 was produced for comparative purposes and is a representative example of a multi-layer stretch film of the type well known to those skilled in the art of stretch film. These three films are referred to as "common industry formulations".

Defect Propagation Resistance Testing

Defect propagation resistance testing was carried out employing a Highlight Ultimate Stretch Tester Puncture Test. Films were tested using the puncture test at varying levels of stretch. The tests were conducted in accord with Highlight Stretch Tester product literature and operating manuals. The stretch levels for the puncture test were set progressively higher until the film repeatedly tore off before the stretch level could be "locked in" by the tester at the desired stretch level precluding completion of a puncture test at the desired stretch level.

Figure 2:
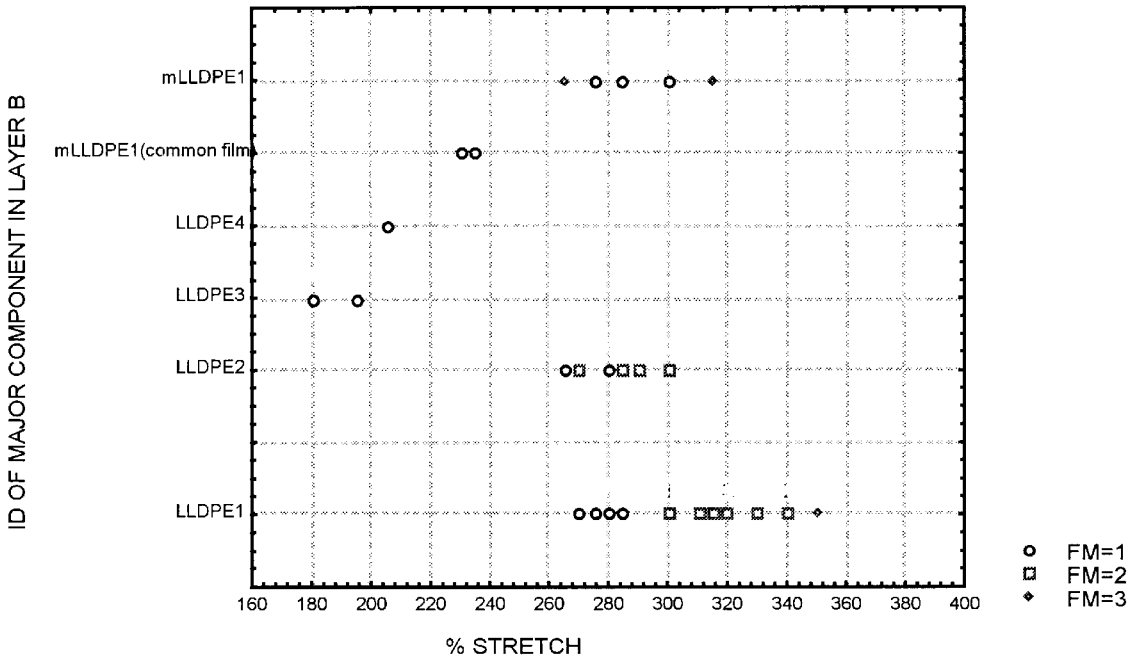
FIG. 2 is the defect propagation resistance test results using highlight stretch tester puncture test at varying levels of stretch percent.

The results of defect propagation resistance testing for all films are given in FIG. 2, defect propagation resistance test results using highlight stretch test at varying levels of stretch percentage. The single most important factor in mitigating defect propagation was for Layer B to not employ m-LLDPE1 as the major component. When the major component of Layer B was m-LLDPE1, no FM2 was observed only FM1 and FM3. During testing, the transition from FM1 to FM3 was striking for film samples 007–008, and 010–011. Either the films did not puncture at all, or they punctured leading rapidly to web destruction. No other factors were more important in controlling defect propagation than the identity of the Layer B major component. Film samples 013–015 also did not show signs of FM3, and generally tore off before any puncture testing could take place when higher levels of stretching were attempted. It would also appear that if a film could be sufficiently stretched in the test without tearing off first, it could ultimately be forced into FM3 after passing though a region of FM2 at lower stretch values. Such was the case where the major component of Layer B was LLDPE1 but not where the major component was m-LLDPE1. Those films readily transitioned between FM1 and FM3 without any sign of exhibiting FM2. The raw data for all films are tabulated below.

Tabular Data for FIG. 2.

| FILM SAMPLE ID | STRETCH (%) | FAILURE MODE | MAJOR COMPONENT |
|---|---|---|---|
| 1 | 315 | 2 | LLDPE1 |
| 2 | 275 | 1 | LLDPE1 |
| 3 | 270 | 2 | LLDPE2 |
| 4 | 340 | 3 | LLDPE1 |
| 4 | 330 | 2 | LLDPE1 |
| 4 | 320 | 2 | LLDPE1 |
| 5 | 300 | 2 | LLDPE1 |
| 6 | 270 | 1 | LLDPE2 |
| 6 | 265 | 1 | LLDPE2 |
| 7 | 285 | 1 | m-LLDPE1 |
| 7 | 300 | 3 | m-LLDPE1 |
| 11 | 300 | 3 | m-LLDPE1 |
| 11 | 300 | 3 | m-LLDPE1 |
| 11 | 315 | 3 | m-LLDPE1 |
| 8 | 285 | 1 | m-LLDPE1 |
| 8 | 300 | 3 | m-LLDPE1 |
| 8 | 300 | 3 | m-LLDPE1 |
| 10 | 265 | 3 | m-LLDPE1 |
| 10 | 265 | 3 | m-LLDPE1 |

-continued

| FILM SAMPLE ID | STRETCH (%) | FAILURE MODE | MAJOR COMPONENT |
|---|---|---|---|
| 11 | 300 | 1 | m-LLDPE1 |
| 11 | 275 | 1 | m-LLDPE1 |
| 12 | 300 | 2 | LLDPE2 |
| 12 | 290 | 2 | LLDPE2 |
| 12 | 285 | 2 | LLDPE2 |
| 12 | 280 | 1 | LLDPE2 |
| 12 | 270 | 2 | LLDPE2 |
| 13 | 195 | 1 | LLDPE3 |
| 13 | 180 | 1 | LLDPE3 |
| 14 | 205 | 1 | LLDPE4 |
| 15 | 235 | 1 | LLDPE4 |
| 15 | 230 | 1 | LLDPE4 |
| 1 | 310 | 2 | LLDPE1 |
| 1 | 310 | 3 | LLDPE1 |
| 1 | 300 | 2 | LLDPE1 |
| 1 | 280 | 1 | LLDPE1 |
| 1 | 270 | 1 | LLDPE1 |
| 2 | 340 | 2 | LLDPE1 |
| 2 | 330 | 2 | LLDPE1 |
| 2 | 320 | 2 | LLDPE1 |
| 2 | 300 | 2 | LLDPE1 |
| 2 | 300 | 2 | LLDPE1 |
| 3 | 270 | 2 | LLDPE2 |
| 3 | 265 | 1 | LLDPE2 |
| 4 | 350 | 3 | LLDPE1 |
| 4 | 320 | 2 | LLDPE1 |
| 4 | 300 | 2 | LLDPE1 |
| 4 | 300 | 2 | LLDPE1 |
| 5 | 300 | 2 | LLDPE1 |
| 5 | 300 | 2 | LLDPE1 |
| 5 | 285 | 1 | LLDPE1 |
| 5 | 270 | 1 | LLDPE1 |
| 6 | 270 | 2 | LLDPE2 |
| 6 | 270 | 2 | LLDPE2 |

Laboratory Puncture Testing

The test method followed for laboratory Puncture Resistance Tester was a modified ASTM D5748-95, as further described later. The run plot shows in FIG. 3, a comparison of experimental films and common formulations, that most of the experimental films produced in this work required significantly more force to puncture relative to the common film formulations. Film samples 003, 006 and 012, the centerpoints in this study, are shown as Film Sample ID "0" in FIG. 3 in order to give an estimate of the reproducibility of both the film fabrication and testing using true replication and to show that the effects of the factors in the designed experiment were larger than variations due to sample production or film testing. Film Sample ID's 13 and 14 contain 100 percent LLDPE and Film Sample ID 15 contains some m-LLDPE.

Figure 3:
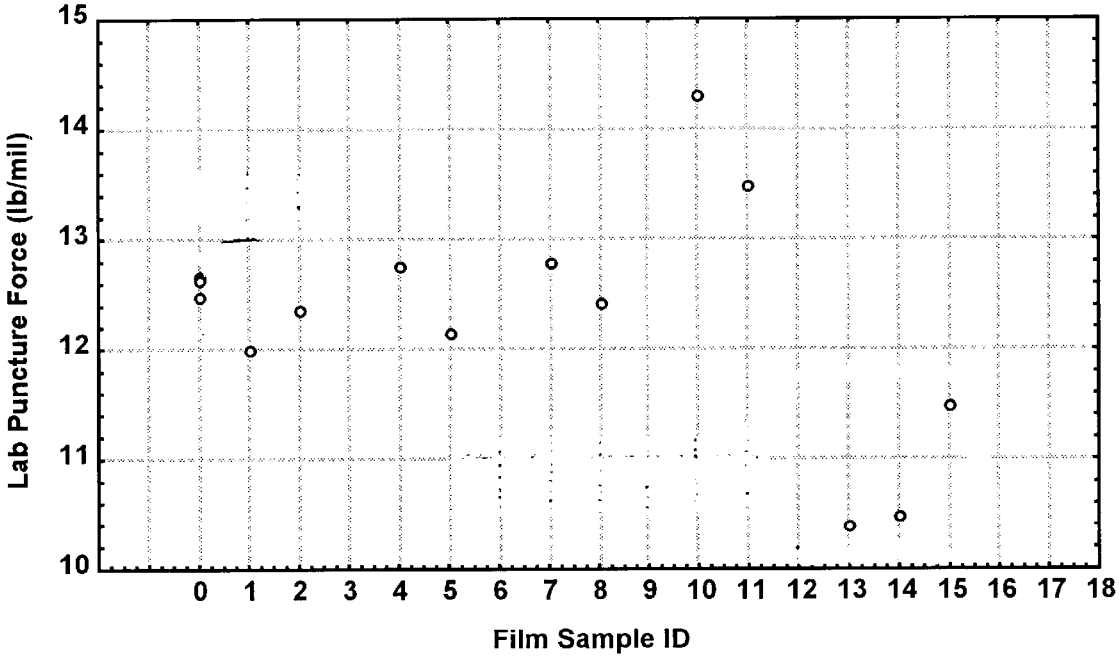
FIG. 3 is the comparison of experimental films and common formulations.

Tabular Lab Puncture Data for FIG. 3.

| FILM SAMPLE ID | PUNCTURE FORCE (lb/mil) |
|---|---|
| 1 | 11.99 |
| 2 | 12.36 |
| 3 | 12.68 |
| 4 | 12.77 |
| 5 | 12.14 |
| 6 | 12.64 |
| 7 | 12.78 |
| 8 | 12.44 |
| 10 | 14.31 |
| 11 | 13.49 |
| 12 | 12.5 |

-continued

| FILM SAMPLE ID | PUNCTURE FORCE (lb/mil) |
|---|---|
| 13 | 10.39 |
| 14 | 10.49 |
| 15 | 11.49 |

Figure 4:
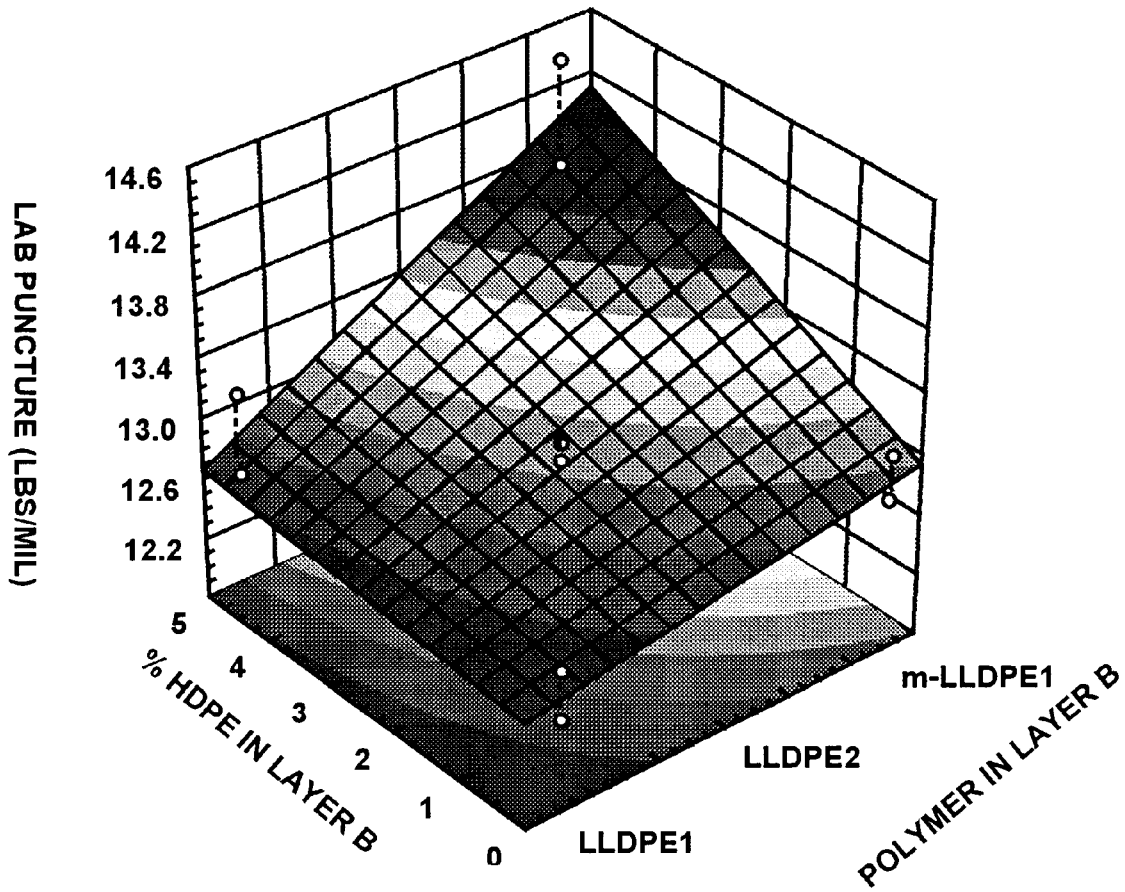
FIG. 4 is the lab puncture response plot.

The experimental lab puncture data above were analyzed with respect to the experimental design factors given in Table 3. The response plot in FIG. 4, a lab puncture response plot, below shows that the combination of 5 wt % HDPE plus 95 wt % m-LLDPE1 in Layer B gave a significant increase in puncture force. These same films, however, also failed catastrophically (FM3) as shown in FIG. 2. FIG. 4 suggests that the combination of 5 wt % HDPE blended on-line with 95 wt % LLDPE2 in Layer B, with A/B/C/B/A layer ratios of 10/20/40/20/10 would be a reasonably good alternative. Lab puncture force would be maximized according to FIG. 4 and defect propagation would be minimized according to FIG. 2. Additionally, this approach would be economically attractive because butene LLDPE's such as LLDPE2 are generally lower in cost. Other highly crystalline polymers besides HDPE would also likely behave in a similar fashion, for example, highly crystalline polypropylene.

Elmendorf Tear Test Results

Figure 5:
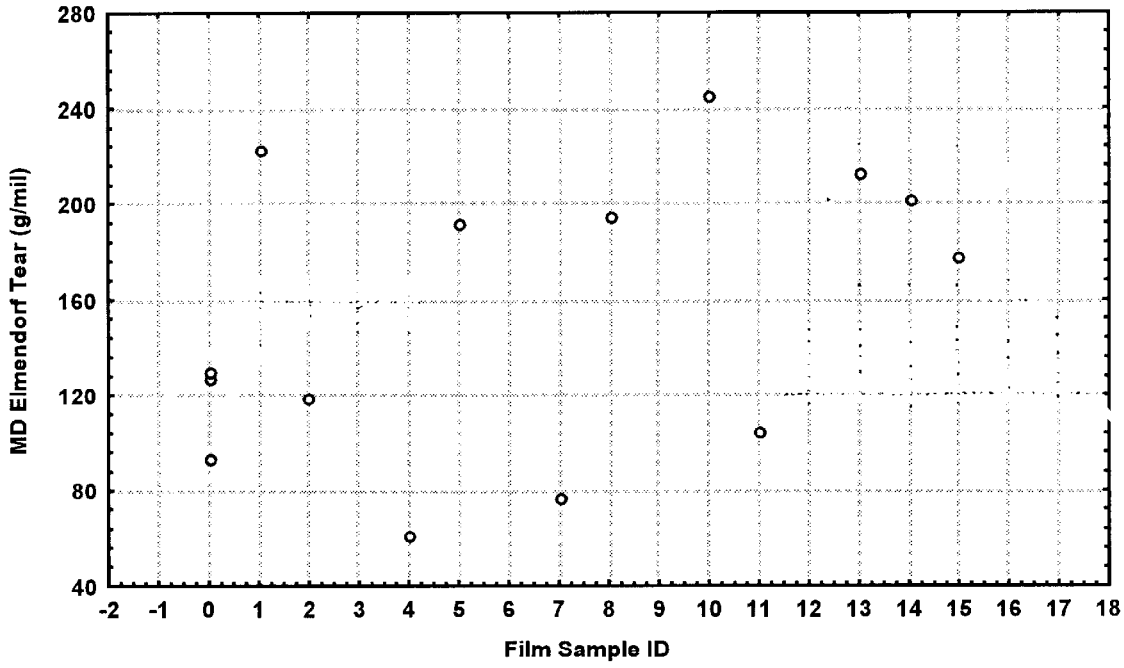
FIG. 5 is the comparison of experimental films to common formulations.

Elmendorf Tear testing was conducted by the method of ASTM D 1922-94. The run plot in FIG. 5, a comparison of experimental films to common formulations shows that certain film formulations gave MD Tear properties at least as good as common formulations in the industry. As in FIG. 3, Film Sample ID are provided to give an estimate of the reproducibility of both the film fabrication and testing using true replication. Also, as in FIG. 3, Film Sample ID's 13 and 14 are 100 percent LLDPE and Film Sample ID contains some m-LLDPE.

Figure 6:
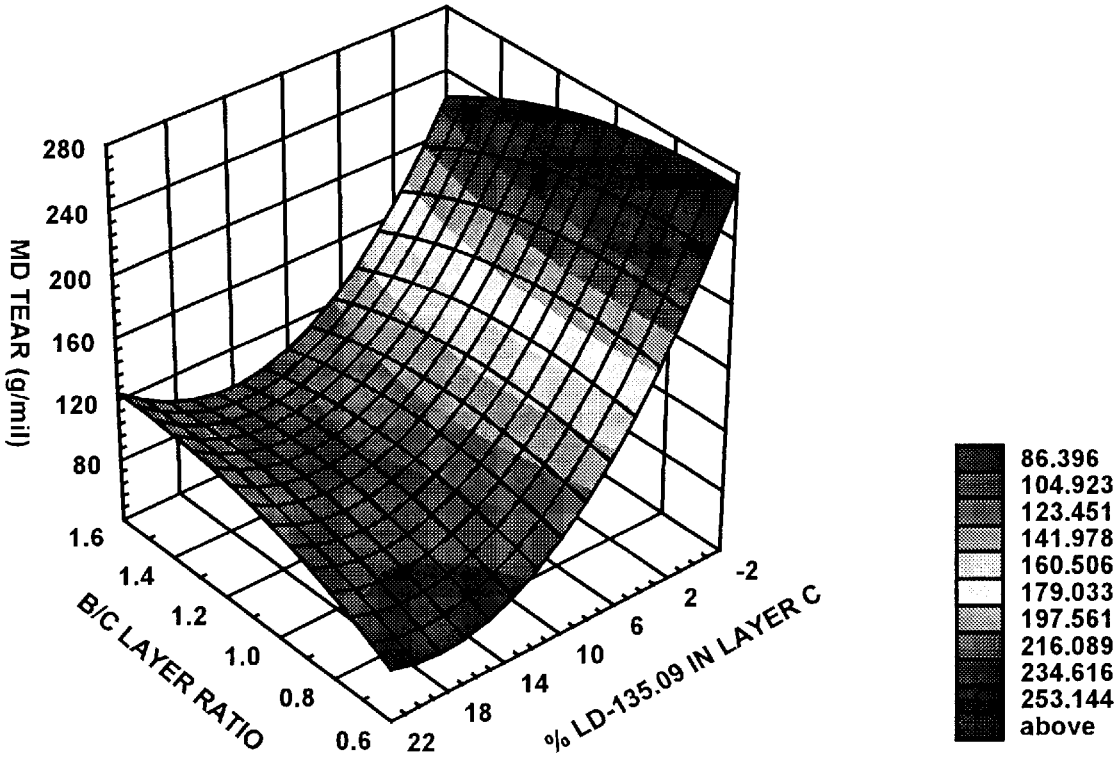
FIG. 6 is the MD Elmendorf tear response plots.

Tabular data for MD Elmendorf Tear Data in FIG. 6 are given below.

| FILM SAMPLE ID | MD ELMENDORF TEAR (g/mil) |
|---|---|
| 1 | 222 |
| 2 | 118 |
| 3 | 94 |
| 4 | 61 |
| 5 | 191 |
| 6 | 127 |
| 7 | 77 |
| 8 | 195 |
| 10 | 245 |
| 11 | 105 |
| 12 | 130 |
| 13 | 213 |
| 14 | 202 |
| 15 | 178 |

The response plot in FIG. 6 shows that lower MD Tear values could be accounted for by higher concentrations of LDPE in Layer C, the center layer. The highest concentration of LDPE in any experimental films was 10 wt %.

In FIG. 6, the following ratios were used:

| A/B/C/B/A LAYER RATIOS (%) | B/C LAYER RATIOS |
|---|---|
| 10/15/50/15/10 | 0.6 |
| 10/20/40/20/10 | 1.0 |
| 10/25/30/25/10 | 1.6 |

Figure 7:
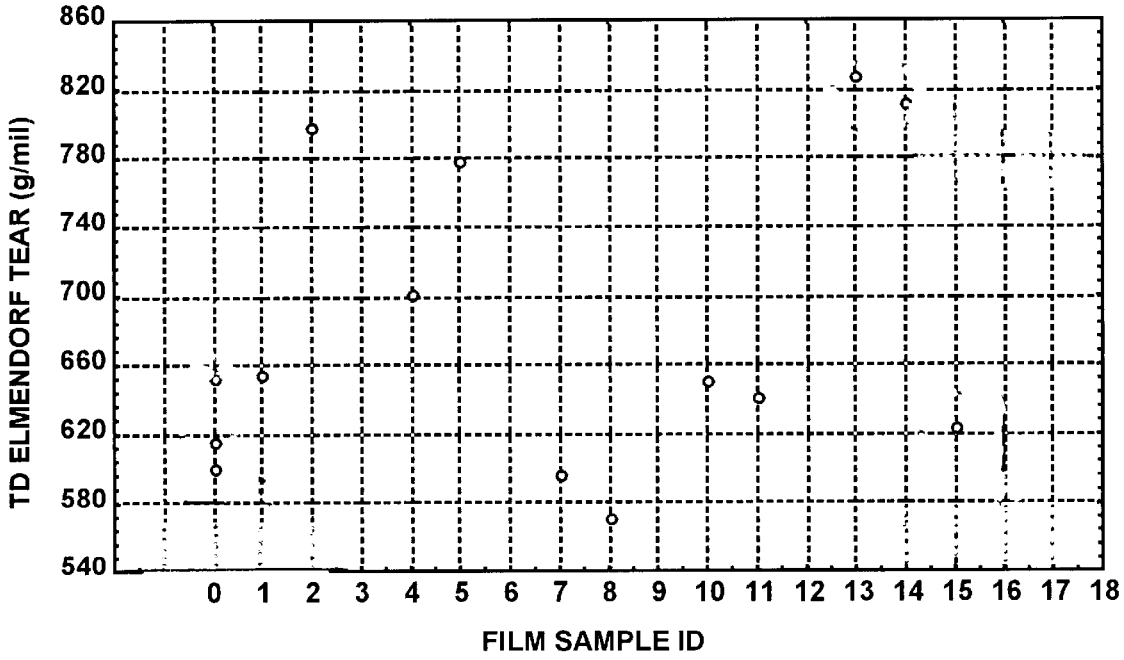
FIG. 7 is the TD Elmendorf tear run plot.

FIG. 7 shows the run plot for TD Tear. There are two noteworthy points regarding this run plot. First, film samples 007–008 and 010–011 had TD Tear values comparable to film sample 015, yet they contained 86–96 wt % m-LLDPE1 while sample 015 contained only 40 wt % m-LLDPE. This suggests that TD Tear strength reduction and m-LLDPE concentration are not necessarily correlated. Secondly, the centerpoint film samples (003, 006 and 012) labeled film sample "0" in FIG. 7 were resistant to the propagation of defects, whereas film samples 007–008 and 010–011 were not. FIG. 2 showed film samples 003, 006 and 012 to be defect propagation resistant and film samples 007–008 and 010–011 not to be defect propagation resistant. These observations thus show that there is no correlation between TD Tear values and defect propagation resistance because TD Tear performance was comparable, but defect propagation resistance was not. Film Sample ID's 13 and 14 contain 100 percent LLDPE while Film Sample ID 15 contains a common industry polyethylene formulation.

Tabular data for MD Elmendorf Tear data in FIG. 7 are given below.

| FILM SAMPLE ID | MD ELMENDORF TEAR (g/mil) | TD ELMENDORF TEAR (g/mil) |
|---|---|---|
| 1 | 222 | 655 |
| 2 | 118 | 798 |
| 3 | 94 | 652 |
| 4 | 61 | 701 |
| 5 | 191 | 779 |
| 6 | 127 | 600 |
| 7 | 77 | 597 |
| 8 | 195 | 571 |
| 10 | 245 | 651 |
| 11 | 105 | 640 |
| 12 | 130 | 616 |
| 13 | 213 | 827 |
| 14 | 202 | 812 |
| 15 | 178 | 624 |

Figure 8:
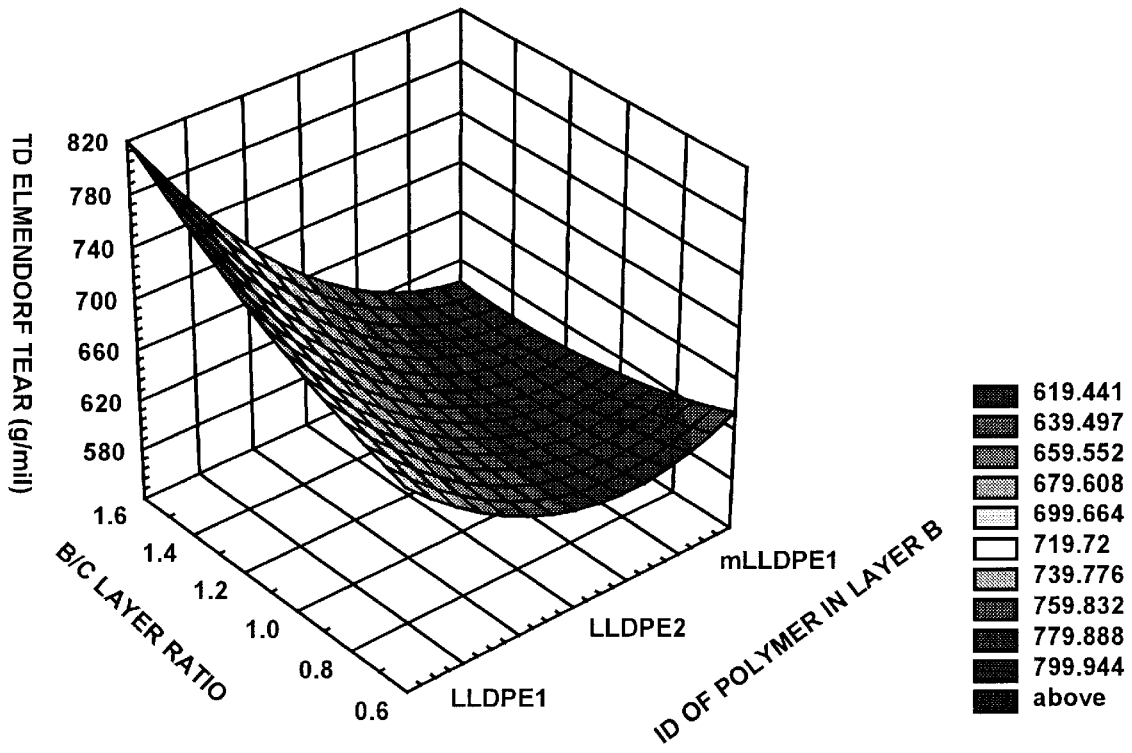
FIG. 8 is the TD Elmendorf tear response plots.

Analysis of the experimental data showed that the concentration of LDPE in Layer C was not a significant factor affecting TD Tear, unlike the MD Tear response. Rather, FIG. 8 shows that the identity of the major component in Layer B was most important, as well as the B/C layer ratio. TD Tear values were highest when the major component of Layer B was LLDPE1. Tear values decreased when the Layer B major component was LLDPE2 or m-LLDPE1.

In FIG. 8, the following ratios were used:

| A/B/C/B/A LAYER RATIOS (%) | B/C LAYER RATIOS |
|---|---|
| 10/15/50/15/10 | 0.6 |
| 10/20/40/20/10 | 1.0 |
| 10/25/30/25/10 | 1.6 |

Unique Combinations of Stiffness and Extensibility Achieved

Films with high proportions of m-LLPDE are generally perceived as softer and stretchier (higher Highlight Ultimate Stretch Test values) by those skilled in stretch film. It would appear that this perception of m-LLDPE has limited its use in stretch film applications requiring higher stiffness. The end user perceives a stretchy film as one with poor load-holding capability in stretch wrapping applications. While stretchiness can be highly desirable, it is generally achieved at the expense of stiffness and vice versa. This disclosure demonstrates how multilayer stretch films (for example, 5-layer cast) can be prepared giving films that are both stiff and highly extensible.

Figure 9:
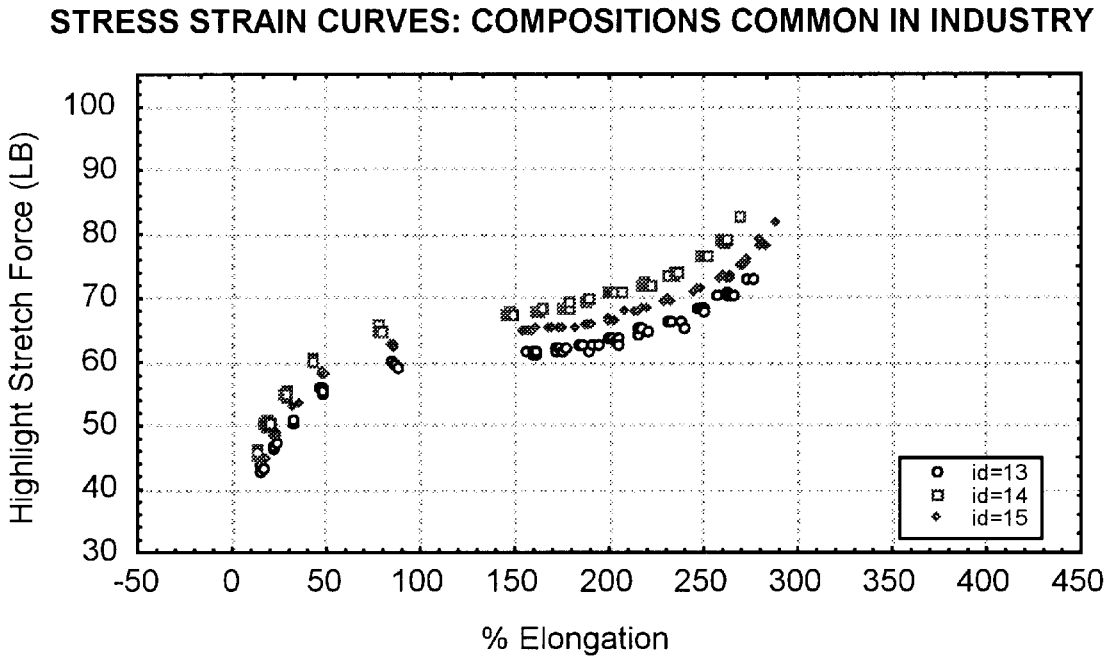
FIG. 9 is the stress-strain curve for common film formulations.
Figure 10:
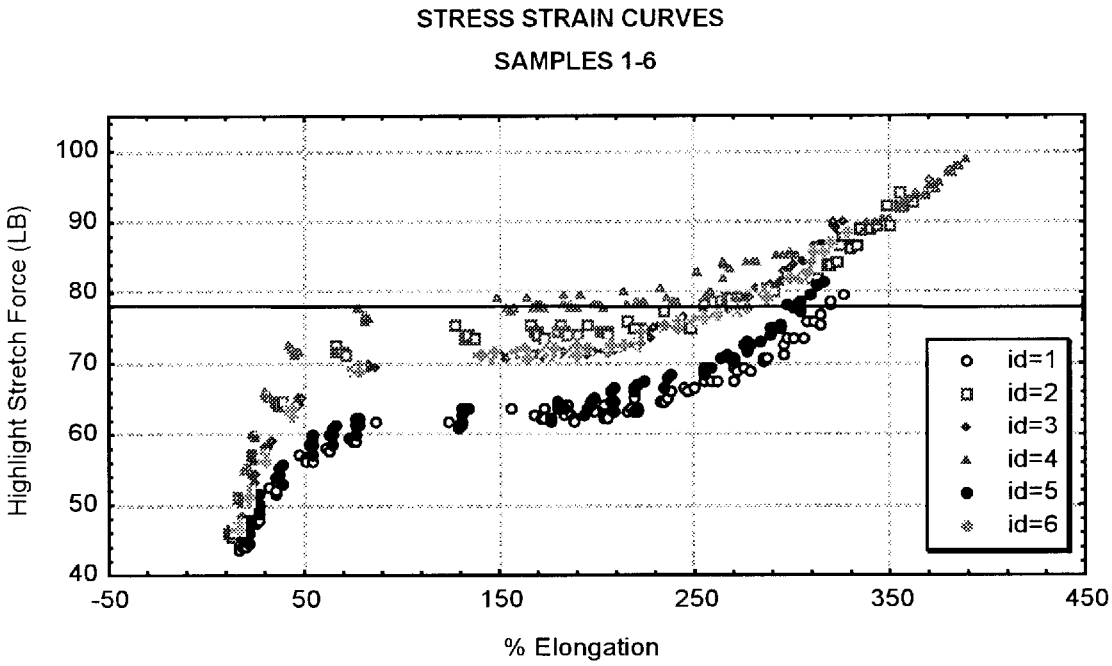
FIG. 10 is the stress-strain curves for experimental films 1–6.
Figure 11:
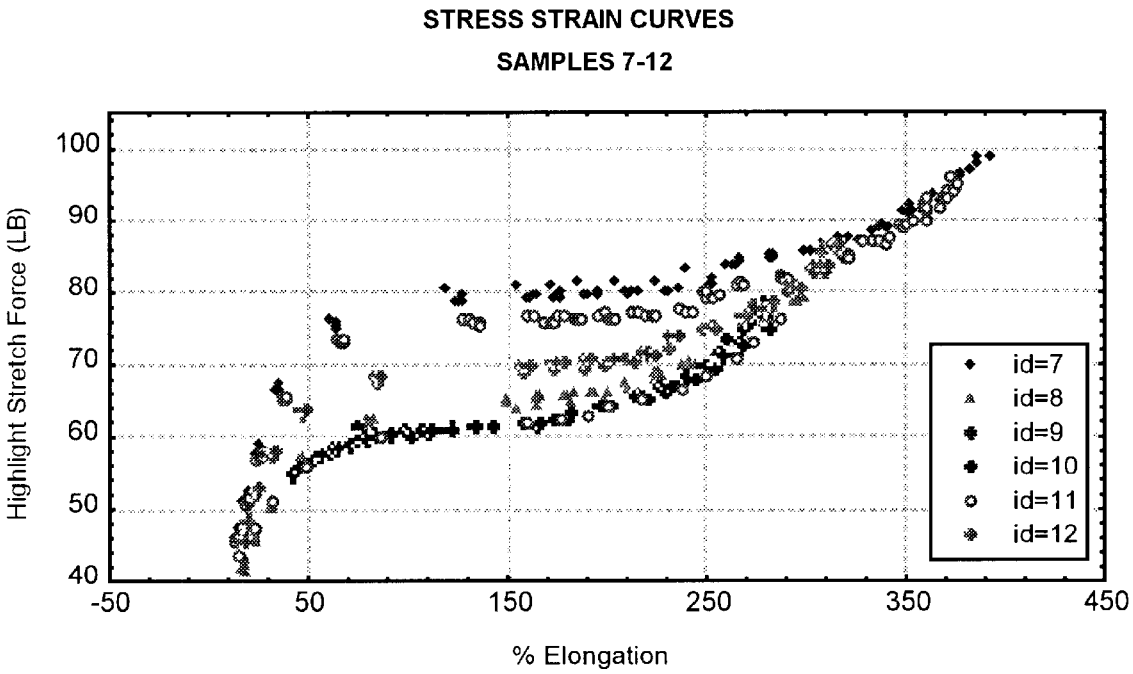
FIG. 11 is the stress-strain curves for experimental films 7–12.

FIGS. 9–11 show stretch force versus stretch percent curves (stress-strain curves) taken from Highlight Ultimate Stretch Test data. Load cells between rollers that stretched the film as it unwound at 180 ft/min measured the amount of force required to stretch the 20-inch film rolls at progressively higher levels of stretch. Following the initial exponential rise in stretch force at lower stretch percent values (50–60%) on the stress-strain curve, the stress-strain curves reached a plateau stretch force. The stretch force remained relatively constant over a wide range of stretch percent values, hence the term of "plateau stretch force". An example of the interpolation to determine plateau stretch force can be seen where a straight line was drawn through the plateau region of the stress-strain curve for film sample 004 in FIG. 10. At higher stretch percent levels, which varied from film to film based on the factors in the study, the film strain-hardened reaching progressively higher levels of stretch force and then finally broke.

Figure 12:
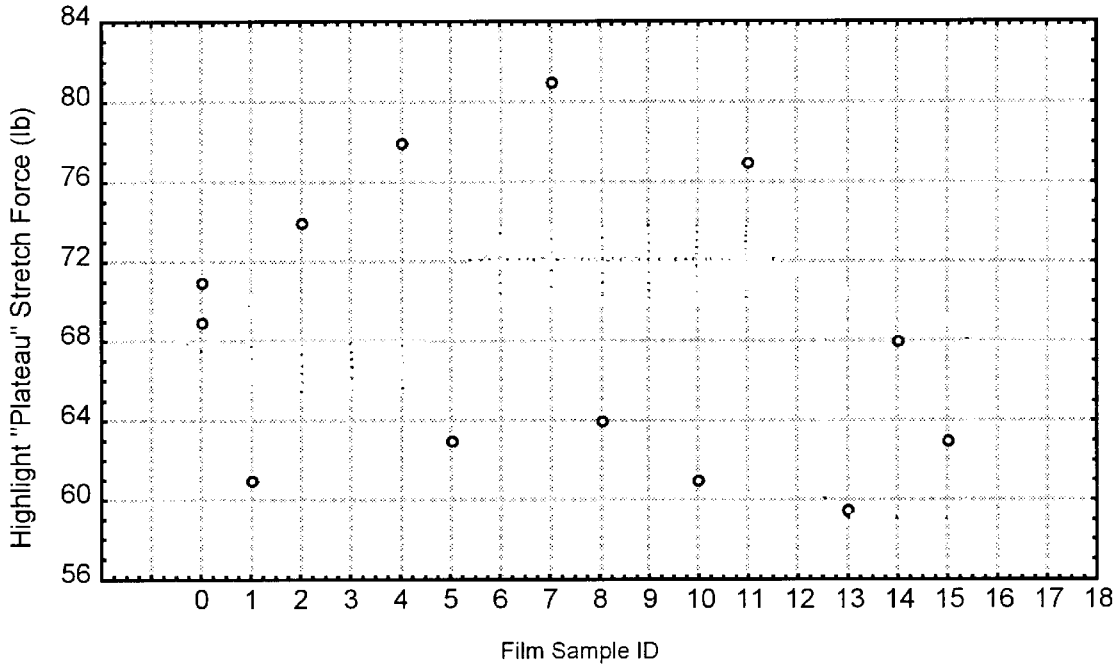
FIG. 12 is the comparison of experimental films stiffness to common formulations.
Figure 13:
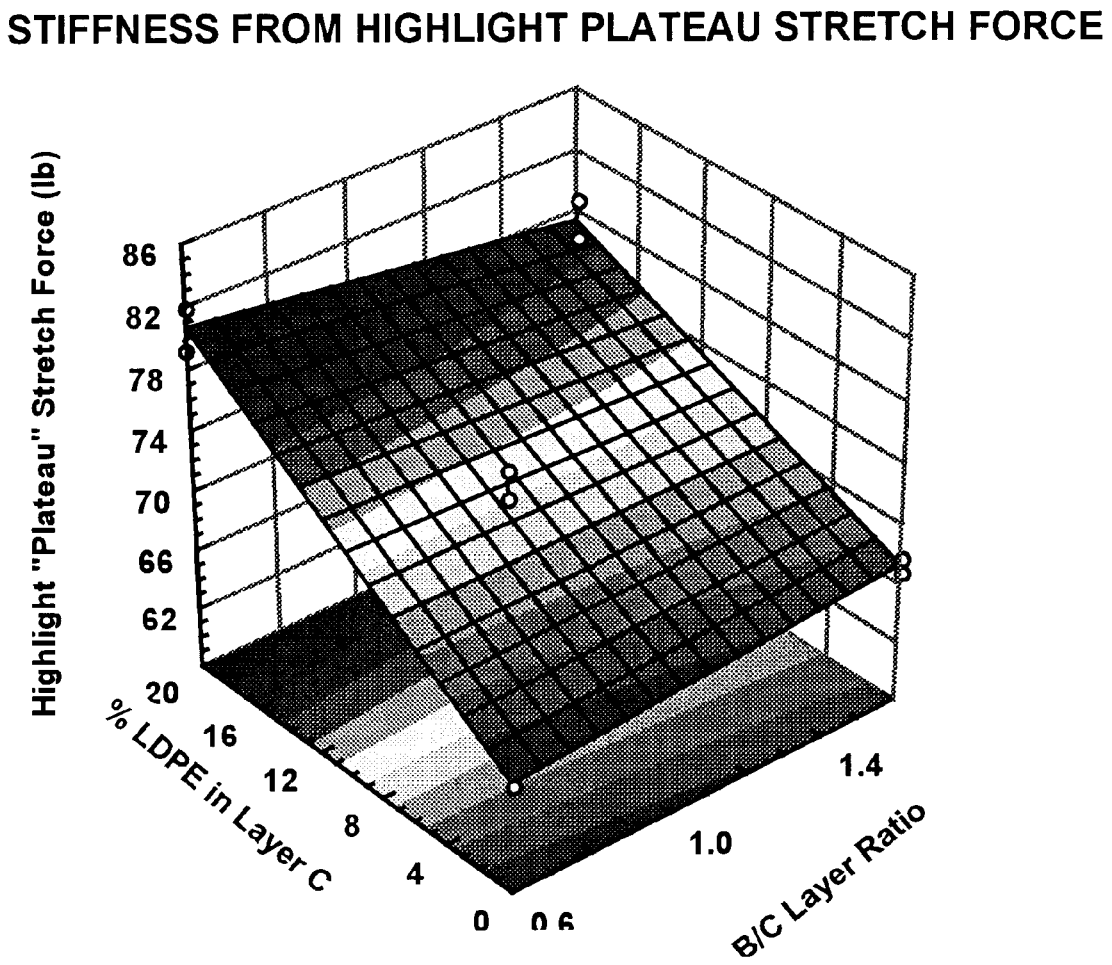
FIG. 13 is the highlight plateau stretch force response plot.
Figure 14:
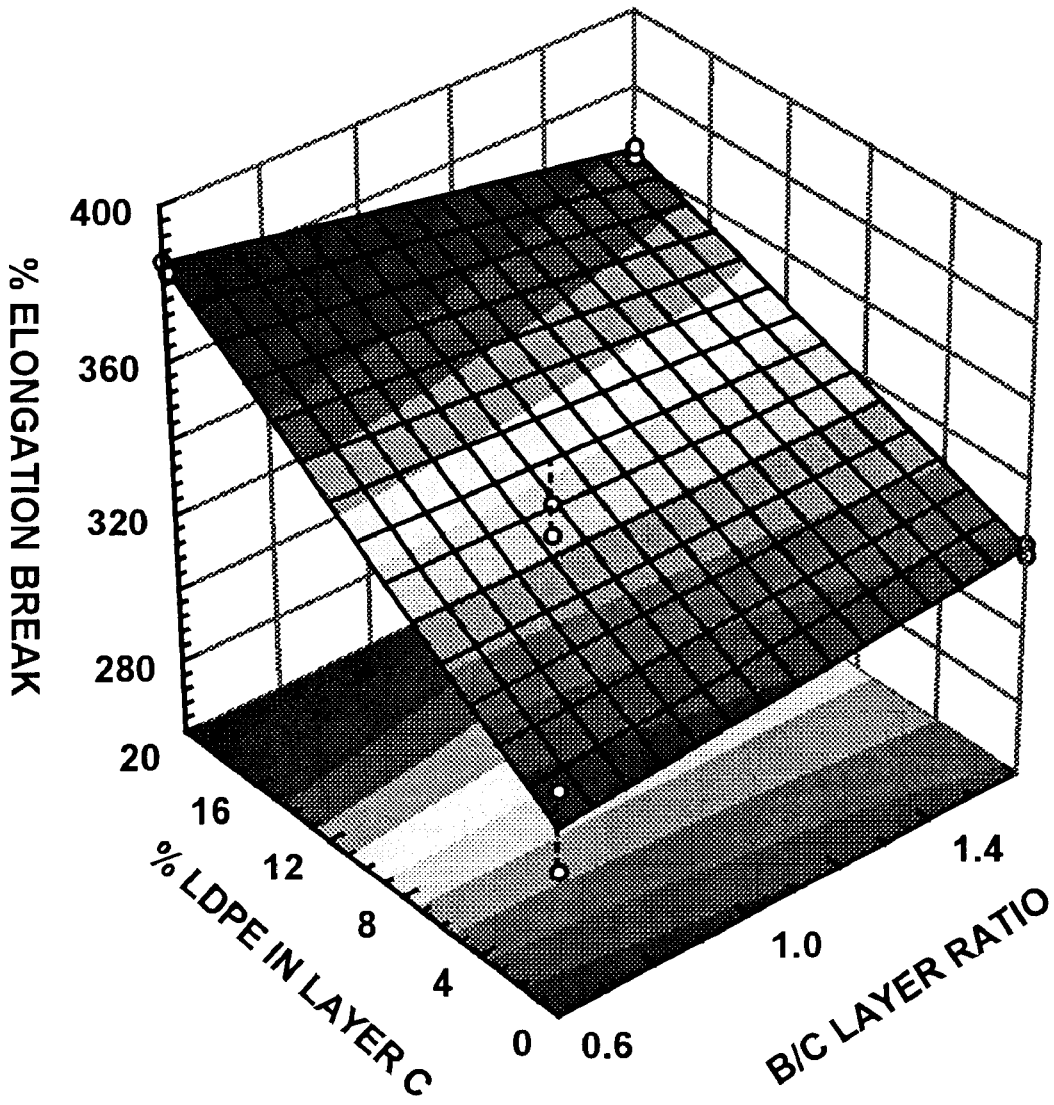
FIG. 14 is the highlight ultimate stretch test: response plot for elongation at break.

FIG. 12 shows that many of the experimental films produced herein were considerably stiffer, or higher in plateau stretch force, than film samples 013–015. The response plot in FIG. 13 shows that the most important factor in increasing stiffness was the higher concentration of LDPE in Layer C. Recall that the highest concentration of LDPE employed in any experimental film structure was 10 wt %. Additionally, the LDPE increased the length of the plateau region resulting in higher film extensibility (higher elongation at break) often referred to as "Highlight Ultimate Stretch" values as shown in FIG. 14. To the end user of stretch film, this combination of stiffness and extensibility should be valuable because the film could be stretched substantially further without breakage when compared to common film formulations (013–015). At higher stretch values, higher stiffness should translate into superior load-holding capacity. As in previous figures, Film Sample ID Ø shows true replicates to graphically demonstrate experimental error. Also, as in previous figures, Film Sample ID's 13 and 14 contain 100 percent LLDPE while Film Sample ID 15 contains some m-LLDPE.

In FIG. 14, the following ratios were used:

| A/B/C/B/A LAYER RATIOS (%) | B/C LAYER RATIOS |
|---|---|
| 10/15/50/15/10 | 0.6 |
| 10/20/40/20/10 | 1.0 |
| 10/25/30/25/10 | 1.6 |

Plateau Stretch Force Tabular Data for FIG. 12.

| FILM SAMPLE ID | PLATEAU ULTIMATE STRETCH FORCE |
|---|---|
| 2 | 74 |
| 3 | 71 |
| 4 | 78 |
| 5 | 63 |
| 6 | 71 |
| 7 | 81 |
| 8 | 64 |
| 10 | 61 |
| 11 | 77 |
| 12 | 69 |
| 13 | 60 |
| 14 | 61 |
| 15 | 63 |

Tabular Highlight Ultimate Stretch Test Elongation (%) at Break for FIG. 13.

| FILM SAMPLE ID | Highlight Ultimate Stretch (Elongation at Break, %) |
|---|---|
| 1 | 304 |
| 2 | 354 |
| 3 | 321 |
| 4 | 384 |
| 5 | 308 |
| 6 | 312 |
| 7 | 381 |
| 8 | 305 |
| 10 | 279 |
| 11 | 358 |
| 12 | 311 |
| 13 | 287 |
| 14 | 283 |
| 15 | 294 |

Reduction in Cling Force Upon Stretching Minimized

Historically, LLDPE produced in gas phase Ziegler-Natta polymerization reactions, has enjoyed wide use in stretch film outer cling layers. This has been attributed to a particularly desirable level of "extractables". One method of determining "extractables" levels is by the FDA hexane extractables test. Blown monolayer film samples of nominal 3-mil thickness were prepared on a small blown film line. The resulting film samples were submitted to a certified lab for the FDA hexane extractables test along with a control film sample. Basically, the "extractables" value was determined by measuring the loss in weight of a film sample after stirring in hexane at 50° C. for 2 hours. The hexane extractables value was reported as an average of two determinations and within the context of a control film sample results. Typical "extractables" values for gas phase LLDPE's such as LLDPE3 would be in the range of 2.7–4 wt %. It is also well known that commercially available ethylene-alpha-olefin copolymers prepared in solution phase Ziegler-Natta processes do not perform as well as their gas-phase counterparts with respect to cling performance. This reduced performance has most often been attributed to lower levels of "extractables" relative to gas phase Ziegler-Natta LLDPE counterparts.

Figure 15:
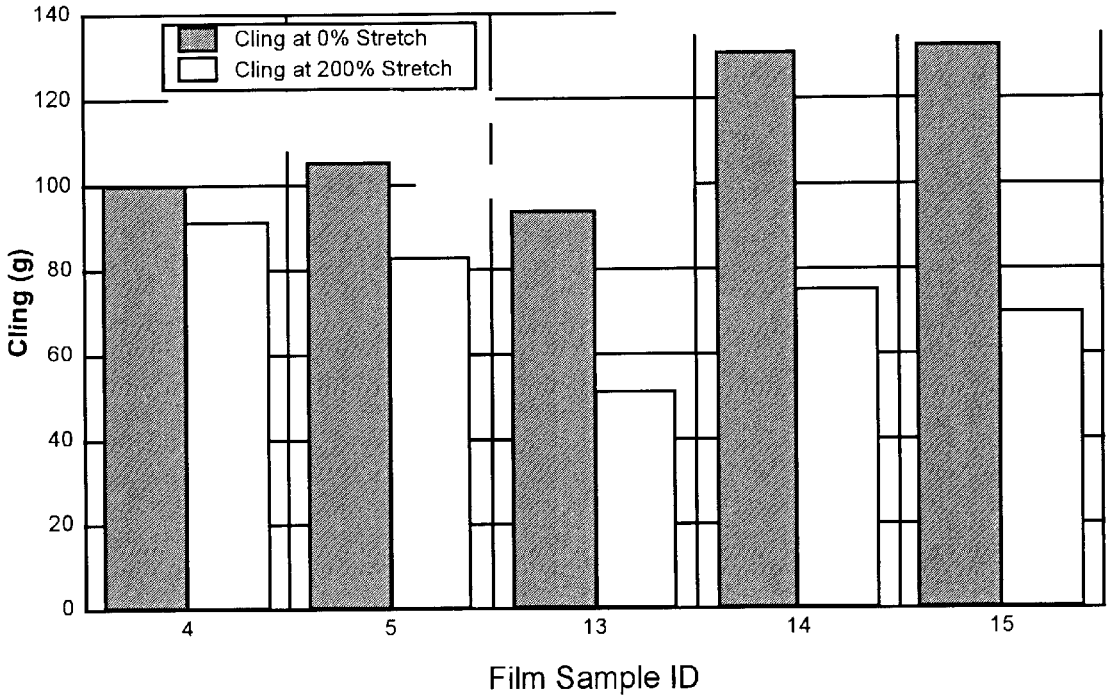
FIG. 15 is the cling at 0 and 200% stretch.

The method employed for cling testing the film samples in this work both at 0% and 200% stretch level was a modified ASTM D5458-95 as described later. It is well known that a depression in cling generally accompanies film stretching. FIG. 15 shows that this reduction was minimized in the samples made from a combination of 80 wt % m-LLDPE1 blended on-line with 20 wt % m-plastomer in Layer A. In FIG. 15, Film Sample ID's 4 and 5 are films having the "A" or outer layer made from 80 weight percent m-LLDPE3. Film Sample ID 14 is a film having layer "A" of 100 percent LLDPE4. Film Sample ID 15 is a film having layer "A" of 100 percent LLDPE4.

Avoid Higher Unwind Force in Stretch Film

This disclosure shows how unwanted increases in stretch film unwind force can be avoided and one reason for its occurrence. Unwind Force for the 20-inch film rolls prepared in this work was defined as the amount of force required to unwind a roll of stretch film at the breaking point during the Highlight Ultimate Stretch Test. A pair of load cells on the tester measured the amount of force in pounds required to unwind the film roll. The average unwind force at break from five ultimate stretch tests was employed in determining unwind force in this work. The procedures used were consistent with the Highlight Ultimate Stretch Tester operating manual. This was viewed as an acceptable measurement of Unwind Force because the value of Unwind Force at any given stretch value during the Highlight Ultimate Stretch test varied little from the value reported by the Highlight Tester when the stretch film broke.

Further crystallization of polymer after winding of a film roll can lead to substantial increases in unwind force. This is an important point as most skilled persons in stretch film would generally attribute this increase in unwind force to an accidental change in film composition, particularly the concentration of "extractables" in the outer cling layers of the film. The concentration of "extractables" in the films made in this work was derived from butene comonomer content measured by $^{1}$H NMR spectra acquired on the individual film samples. Thus, in this data set, we are assured of minimal variations in composition or extractables that might otherwise account for the unusually large differences in unwind force between film samples.

FIG. 15 shows that the interaction between the concentration of HDPE in Layer B and the B/C Layer ratio led to the unwanted increase in unwind force. Specifically, when the concentration of HDPE in Layer B was highest, and Layer B was at its thinnest, unwind force increased substantially because of the interaction between these two factors. The data suggest that this interaction between factors caused strain-induced crystallization after winding which resulted in a "contraction" of the film in the MD direction, the primary axis of orientation and stress in the films. As a result of this contraction in primarily MD, pressure directed inwards toward the core of the film roll increased which squeezed adjacent film sheets together more tightly resulting in the observed increase in unwind force. As can be seen from FIG. 16, a decrease in the concentration of HDPE Layer in B or an increase in the B/C Layer ratio reduced the unwind force.

Figure 16:
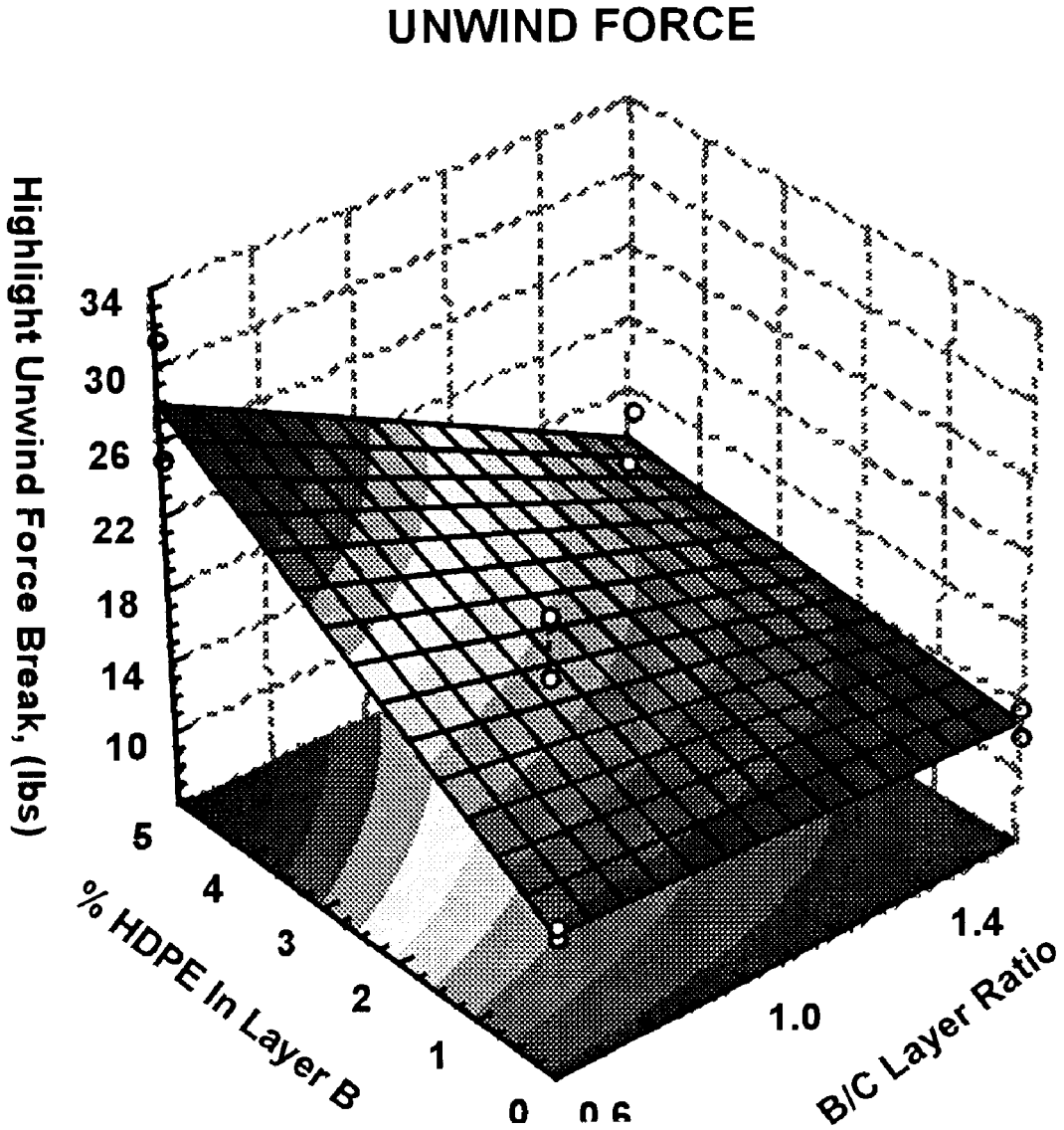
FIG. 16 is the response plot for highlight ultimate stretch test unwind force at break.

For FIG. 16, the following layer ratios were used:

| A/B/C/B/A LAYER RATIOS (%) | B/C LAYER RATIOS |
|---|---|
| 10/15/50/15/10 | 0.6 |
| 10/20/40/20/10 | 1.0 |
| 10/25/30/25/10 | 1.6 |

There are certainly other ways of causing a delay in complete crystallization of the film, such as insufficient removal of heat during extrusion. There are also many other causes of increased unwind force, such as higher "extractables". The results of this particular work; however, do highlight the importance of ensuring that the majority of crystallization occurs before film winding, and also the potentially deleterious effects of increased stress even in a specific film layer of a multi-layer film structure.

Tabular data for Unwind Force (FIG. 16)

| FILM SAMPLE ID | Ultimate Stretch Test Unwind Force at Break (lb) |
|---|---|
| 1 | 9.7 |
| 2 | 9.6 |
| 3 | 15.4 |
| 4 | 23.2 |
| 5 | 13.3 |
| 6 | 11.9 |
| 7 | 10.5 |
| 8 | 7.7 |
| 10 | 31 |
| 11 | 9.9 |
| 12 | 15.7 |
| 13 | 7.5 |
| 14 | 9.5 |
| 15 | 10.2 |

For FIG. 16, the following layer ratios were used:

| A/B/C/B/A LAYER RATIOS (%) | B/C LAYER RATIOS |
|---|---|
| 10/15/50/15/10 | 0.6 |
| 10/20/40/20/10 | 1.0 |
| 10/25/30/25/10 | 1.6 |

Film Testing Methodology

MD and TD refer to the machine direction and transverse direction, respectively, as they relate to cast film production. All film properties reported in this work were normalized to the target thickness of the film (0.8 mil, 1 mil=1/1000 in.). As with any process a certain amount of variation is to be expected, hence the normalization of film properties to film gauge. Typical gauge variation observed in this work was between 0.74–0.86 mil. The film testing procedures employed in this work were similar to those called for in ASTM procedures. Because the ASTM procedures were not exactly followed, however, the test results cannot be regarded as meeting ASTM standards. Below, the ASTM procedures for each film test employed in this work are referenced along with the differences between the ASTM procedure and the method followed in this work. Defect Propagation Resistance testing on the Highlight Ultimate Stretch Tester is discussed separately in the body of the text. The Highlight Ultimate Stretch Test and the Highlight Puncture Test were each conducted in accord with Highlight Industries, Inc. Film Development Test System Operations Manual (Copyright, 1996). The following testing methods were conducted in accord with ASTM procedures and the results can be regarded as having met the ASTM requirements: Melt Index (ASTM D1238-94), Density (ASTM D1505-96), compression molding of samples by ASTM D1928-96. FDA Hexane Extractables, mentioned briefly in this work, was conducted by the method of 21 CFR 177.1520(d)(3)(ii).

Gauge Measurement

In this work, film gauge was measured with a Gauge Mic (Micrometer Mfr. Heidenhain) in a manner similar to ASTM D-374 Method C, but with the following exception: The micrometer was calibrated to 0.01 mil annually by the vendor. The ASTM procedure calls for monthly calibration and control charting using a recognized standard +/−10% of the smallest micrometer measurement (0.001 mil) in this case.

Laboratory Puncture Resistance Test

The Puncture testing in this work was conducted on a United Testing Machine SFM-1. The testing procedure followed was similar to ASTM D-5748-95 with the following exceptions: 1) A 0.75-inch diameter elongated stainless steel probe with matte finish was employed. The ASTM test method calls a 0.75-inch diameter pear-shaped Teflon probe. 2) In our testing, two HDPE slip sheets each approximately 0.25 mils thick lying loosely on the surface of the test specimen were employed. This was done in order to correct for any possible differences in puncture resistance in the testing of stretch wrap films related to differences in the film area contacting the probe. These differences can arise if differences in cling force between film samples exist. The ASTM test method does not call for the use of slip-sheets. 3) Gauge measurement. In our testing, we used the Gauge Mic Procedure mentioned above for the average thickness. In the ASTM method, the average of three readings in the test area for each of the five specimens tested is employed to calculate puncture resistance per mil of film. In our testing, we report Average Peak Load (lbs.) normalized to the film gauge, which is interpreted as the maximum force achieved. Additionally, our method reports Average Break Energy (inch lbs.) normalized to the film gauge. This value indicates the energy required to break the film. In the ASTM method, the Peak Force at Break (lbs) is also reported as well as the Probe Penetration Distance (in). We do not report probe penetration data or Peak Force at Break.

Propagation Tear Resistance of Plastic Film & Thin Sheeting by Pendulum Method (Elmendorf Tear Test)

Films in this work were tested in a manner similar to that of ASTM D-1922-94a on a Thwing-Albert Elmendorf Digi-Tear with the following exceptions: The micrometer foot pressure employed in film gauge measurement associated with the test was between 4.6 and 6.7 psi. This pressure was lower than that called for by ASTM D-1922-94a which calls for the pressure exerted by the gage or micrometer foot to be between 160 and 185 kPa (23 and 27 psi). We normalized tear test results in this work to the film gauge, hence, the comments in the preceding paragraphs on film gauge testing with a micrometer are also applicable here.

Peel Cling of Stretch Wrap Films (Cling Testing)

The cling testing was similar to ASTM method D-5458-95 with the following exceptions: 1) Line grips with one flat rubber side and one curved steel side were used to hold the string and the clip which pulls the one-inch strip from the incline plane. The ASTM procedure (ASTM D-5458-95) calls for flat rubber sides on both grips. 2) Due to the line grip apparatus weight we used a 20 lb load cell. The ASTM procedure calls for a 500 gram load cell. A crosshead speed of 3.94 in/min (10.00 cm/min) was employed. The ASTM method calls for a crosshead speed of 5 in/min. 4) For 100% & 200% stretch cling values, we stretched both the 1-in. test strip (top) and the specimen attached to the incline plane (bottom). The ASTM procedure calls only for stretching of the specimen on the incline plane (bottom) to the target stretch value. The test strip (top) is not stretched in the ASTM method.

I claim:

1. A film comprising a polymer of linear low density polyethylene (LLDPE) and one or more copolymers selected from the group consisting of low density polyethylene (LDPE), very low density polyethylene (VLDPE), and ultra low density polyethylene (ULDPE).

2. A film comprising a polymer of linear low density polyethylene (LLDPE) and one or more copolymers selected from the group consisting of low density polyethylene (LDPE), very low density polyethylene (VLDPE), and ultra low density polyethylene (ULDPE), wherein the LLDPE comprises ethylene and at least one alpha olefin monomer selected from the group consisting of propylene, 1-butene, 1-pentene, 1-hexene, 3-methyl-1-pentene, 4-methyl-1-pentene, 1-octene, 1-decene, and 1-dodecene, the alpha olefin monomer having a content generally below about 1 to about 15 wt %; the LLDPE having:

a) a melt index of from about 1 to about 5 dg/min;

b) a density of from about 0.88 to about 0.94 g/cc;

c) a molecular weight of from about 50,000 to about 200,000;

d) a molecular weight distribution of from about 2 to about 4;

e) a ratio of the third moment to the second moment below from about 1.6 to about 1.95; and f) a melt flow ratio from about 16 to about 18.

* * * * *